United States Patent [19]

Nagata et al.

[11] Patent Number: 5,351,224
[45] Date of Patent: Sep. 27, 1994

[54] ADJUSTMENT OF TRACKING SERVO AND FOCUSING SERVO IN OPTICAL DATA RECORDING/REPRODUCING APPARATUS

[75] Inventors: Shizuo Nagata; Yasuhiro Suzuki; Tutomu Tabata; Masahiro Takahashi, all of Tokyo, Japan

[73] Assignee: Oki Electric Industry Co., Ltd., Tokyo, Japan

[21] Appl. No.: 112,655

[22] Filed: Aug. 27, 1993

Related U.S. Application Data

[63] Continuation of Ser. No. 665,231, Mar. 6, 1991, abandoned.

[30] Foreign Application Priority Data

| Mar. 8, 1990 | [JP] | Japan | 2-57068 |
| Mar. 8, 1990 | [JP] | Japan | 2-57069 |
| Mar. 9, 1990 | [JP] | Japan | 2-59482 |

[51] Int. Cl.$^5$ .............................................. G11B 7/09
[52] U.S. Cl. .............................. 369/44.29; 369/44.34; 369/44.35; 369/54
[58] Field of Search .............. 369/44.27, 44.29, 44.32, 369/44.34, 44.35, 44.36, 54, 58

[56] References Cited

U.S. PATENT DOCUMENTS

| 4,607,157 | 8/1986 | Millar et al. | 369/44.29 X |
| 4,707,648 | 11/1987 | Minami | 369/44.35 X |
| 4,769,801 | 9/1988 | Funada et al. | 369/44.29 |
| 4,823,330 | 4/1989 | Arter et al. | 369/44.35 |
| 5,048,002 | 9/1991 | Horie et al. | 369/44.35 |
| 5,050,151 | 9/1991 | Kurz | 369/44.29 |
| 5,077,719 | 12/1991 | Yanagi et al. | 369/44.29 X |
| 5,103,439 | 4/1992 | Bierhoff et al. | 369/44.35 X |
| 5,105,406 | 4/1992 | Imanaka | 369/44.35 X |

OTHER PUBLICATIONS

"Essentials of Optical Pickup System Design", Japan Technology Center, Oct. 31, 1984, pp. 151–153 & 160–162 172–173, Terada.

*Primary Examiner*—W. R. Young
*Attorney, Agent, or Firm*—Wenderoth, Lind & Ponack

[57] ABSTRACT

An optical pickup emits a light beam onto a recording medium and outputs, in response to a reflection from the medium, a first and a second signal for controlling focusing servo control and tracking servo control, respectively. A signal generating section generates a focus error signal and a tracking error signal in response to the first and second signals, respectively. A driving section is responsive to the output of the signal generating section for outputting a first and a second drive current assigned to focusing and tracking, respectively. An actuator moves the pickup in a focusing direction and a tracking direction by the first and second drive currents, respectively. An adjusting section detects two values close to the maximum and minimum values of the tracking error signal at the start of the focusing servo control and adjusts the gain of the second signal on the basis of a difference between the detected values. Alternatively, the offset of the second signal may be adjusted by the sum of the two detected values. Further, the offset of the first signal may be adjusted by a focus offset occurring when the amplitude of the first and second signals appearing after the start of the focusing servo control or the amplitude of a third signal also outputted by the pickup and representative of recorded data and appearing after the start of tracking servo is close to the maximum.

8 Claims, 13 Drawing Sheets

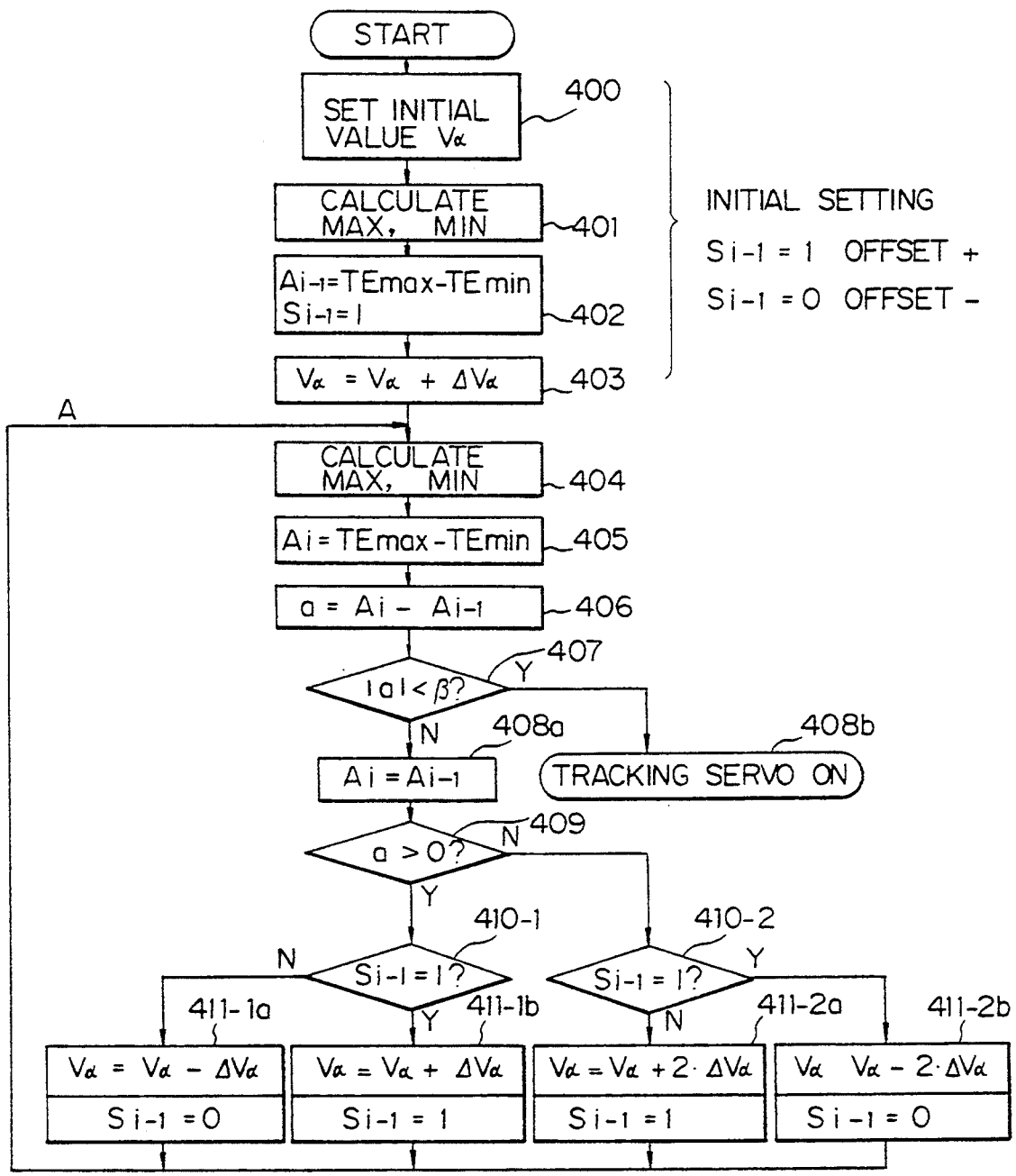

ADJUSTMENT OF TRACKING SERVO AND FOCUSING SERVO IN OPTICAL DATA RECORDING/REPRODUCING APPARATUS

This application is a continuation of now abandoned application, Ser. No. 07/665,231, filed on Mar. 6, 1991.

BACKGROUND OF THE INVENTION

1. Field of the Invention

The present invention relates to an optical data recording/reproducing apparatus and, more particularly, to an optical data recording/reproducing apparatus such as an addition type or an exclusive playback type optical disk apparatus or an erasable or rewritable photomagnetic disk apparatus.

2. Description of the Prior Art

An optical data recording/reproducing apparatus of the type described is disclosed, for example, in Terada "Essentials of Optical Pickup System Design", Japan Technology Center, [6], Oct. 31, 1984, pp. 151, 152 and 161. As taught in this document, an optical data recording/reproducing apparatus, such as an optical disk apparatus, has an optical pickup which emits a light beam onto a recording layer provided on an optical disk which is a specific form of an optical recording medium. Receiving a reflection from the recording layer, the pickup detects a focus error and a tracking or tracing error to output signals for focusing servo control and tracking servo control. A servo error signal generating means generates a focus error signal and a tracking error signal in response to the output signals of the pickup. A drive means produces a drive current for focusing and a drive current for tracking on the basis of the focus error signal and tracking error signal. An actuator moves the pickup in a focusing direction and a tracking direction by the drive currents.

An optical disk apparatus having the above construction rotates an optical disk by a spindle motor or similar drive source and reads data out of the disk while effecting feedback control (servo). Specifically, the drive means moves the pickup in the focusing direction and tracking direction via the actuator in response to the focus error signal and tracking error signal fed thereto from the servo error signal generating means, thereby correcting the focus error and tracking error. An optical disk for use with this type of apparatus has great capacity and durability due to optical recording and reproduction of data and is extensively used for various purposes such as document filing.

However, the problem with the conventional optical disk apparatus, for example, is that it is not operable with different kinds of optical disks, i.e., the kind of usable disks is limited on a manufacturer basis or on a model basis. More specifically, optical disks in general share substantially the same characteristics regarding reflectance and recording sensitivity. This stems from the fact that the quality and quantity of a material for forming a recording layer by sputtering or vacuum evaporation can be controlled relatively easily. However, the physical configuration of tracks or channels provided on an optical disk such as the depth and shape depends on the kind of the disk, i.e., the type of the disk with which a particular optical disk apparatus is operable.

For the reasons described above, when different kinds of opticals disks are used with a single optical disk apparatus, the amplitude of a tracking error signal produced by the optical pickup noticeably differs from one disk to another. Assume that the apparatus has the gain of tracking servo thereof, i.e., the tracking gain, matched to a particular kind of optical disks. Then, should the amplitude of the tracking error signal be great, the tracking gain would be excessively great and cause the tracking servo loop to oscillate. Conversely, should the amplitude of the tracking error signal be small, the tracking gain would be inadequate and cause the tracking error to increase.

Another drawback particular to the playback of different kinds of optical disks by a single apparatus is that the offset of tracking servo, i.e., the tracking offset produced by the pickup, greatly differs from one disk to another. Specifically, an optical disk apparatus whose tracking offset is matched to a certain kind of optical disks cannot play back the other kinds of disk without being accompanied by different tracking offsets. The change in the tracking offset would cause the tracking position to deviate and thereby degrade the C/N (signal-to-noise) ratio of a reproduced signal. Moreover, on the deviation of the tracking offset, the optical pickup is apt to move beyond the expected tracking control range, preventing normal tracking from being performed. Then, the pickup would uncontrollably run toward the innermost edge or the outermost edge of the disk.

As discussed above, the conventional optical disk apparatus lacks interchangeability as to optical disks and, therefore, the portability (replaceability) which is one of outstanding features thereof cannot be made most of. While various attempts have been made to reduce the access time and cost to implement a high performance optical disk apparatus, the interchangeability of optical disks is the pressing question.

Considering the long life (e.g.-more than ten years) and the large capacity of optical disks, it is preferable that the optical disk apparatus also have a long service life. Optical disks having greater capacities, i.e., higher bit densities, or higher track densities are available today. This kind of disks need a servosystem capable of following the tracks accurately with a focus error of less than ±1 micron. Therefore, when the apparatus is used over a long period of time, it is likely that the focus deviates due to the deflection of a base which supports the pickup or the deterioration of various elements incorporated in the pickup. The deviation of focus prevents a light beam from being focused on a disk and thereby degrades or practically makes the recording and playback function unattainable.

Customarily, an optical disk apparatus has the focus offset thereof adjusted by the manufacturer before shipment and lacks a user-oriented implementation for readjustment. Hence, when the above-mentioned base is deflected or the various components of the pickup are deteriorated due to aging, it is difficult for the user to readjust the focus. The deviation of focus due to aging lowers the C/N ratio of sensed signals and thereby reduces the reading rate or, in the worst case, prevents track addresses and sector addresses from being read out of an optical disk while disabling the recoding function as well.

The problems described above are brought about not only with optical disk apparatuses but also photomagnetic disk apparatuses. Optical disks, photomagnetic disk, optical cards and other similar recording media will be collectively referred to as optical recording media hereinafter.

SUMMARY OF THE INVENTION

It is therefore an object of the present invention to provide an optical data recording/reproducing apparatus capable of effecting accurate tracking servo with no regard to the kind of optical recording medium.

It is another object of the present invention to provide an optical data recording/reproducing apparatus which eliminates the deviation of focus due to aging.

In accordance with the present invention, a servo gain adjusting device has an optical pickup for emitting a light beam onto a recording medium and for outputting, in response to a reflection from the medium, a first and a second signal for controlling a focusing servo and a tracking servo, respectively. A signal generating section generates a focus error signal and a tracking error signal in response to the first and second signals, respectively. A drive section is responsive to the signal generating section for outputting a first and a second drive current assigned to focusing and tracking, respectively. An actuator moves the optical pickup in a focusing direction and a tracking direction by the first and second drive currents, respectively. An adjusting section detects values close to the maximum and the minimum of the tracking error signal at the start of the focusing servo control and adjusts the gain of the second signal on the basis of a difference between the two above-mentioned values.

Also, in accordance with the present invention, a tracking offset adjusting device has an optical pickup for emitting a light beam onto a recording medium and outputting, in response to a reflection from the medium, a first and for a second signal for controlling a focusing servo and a tracking servo, respectively. A signal generating section generates a focus error signal and a tracking error signal in response to the first and second signals, respectively. A drive section is responsive to the signal generating section for outputting a first and a second drive current assigned to focusing and tracking, respectively. An actuator moves the optical pickup in a focusing direction and a tracking direction by the first and second drive currents, respectively. An adjusting section detects values close to the maximum and minimum of the tracking error signal at the start of the focusing servo control and adjusts an offset of the second signal on the basis of a sum of the above-mentioned values.

Further, in accordance with the present invention, a focus offset adjusting device has an optical pickup for emitting a light beam onto a recording medium and for outputting, in response to a reflection from the medium, a first and a second signal joining in focusing servo control and tracking servo control, respectively, and a third signal representative of data recorded in the medium. A signal generating section outputs, in response to the first and second signals, a servo error signal assigned to a focusing servo and a servo error signal assigned to a tracking servo. A drive section outputs, in response to the servo error signals, a first and a second drive current assigned to focusing and tracking, respectively. An actuator moves the optical pickup in a focusing direction and a tracking direction in response to the first and second drive currents, respectively. An adjusting section determines a focus offset at which either one of the first and second signals appearing at the start of the focusing servo control and the third signal appearing after the start of tracking servo control has reached a maximum amplitude, and adjusts an offset of the first signal by the focus offset.

BRIEF DESCRIPTION OF THE DRAWINGS

The objects and features of the present invention will become more apparent from the consideration of the following detailed description taken in conjunction with the accompanying drawings in which:

FIG. 18 is a flowchart showing a focus offset setting procedure particular to the embodiment.

DESCRIPTION OF THE PREFERRED EMBODIMENTS

Figure 1:
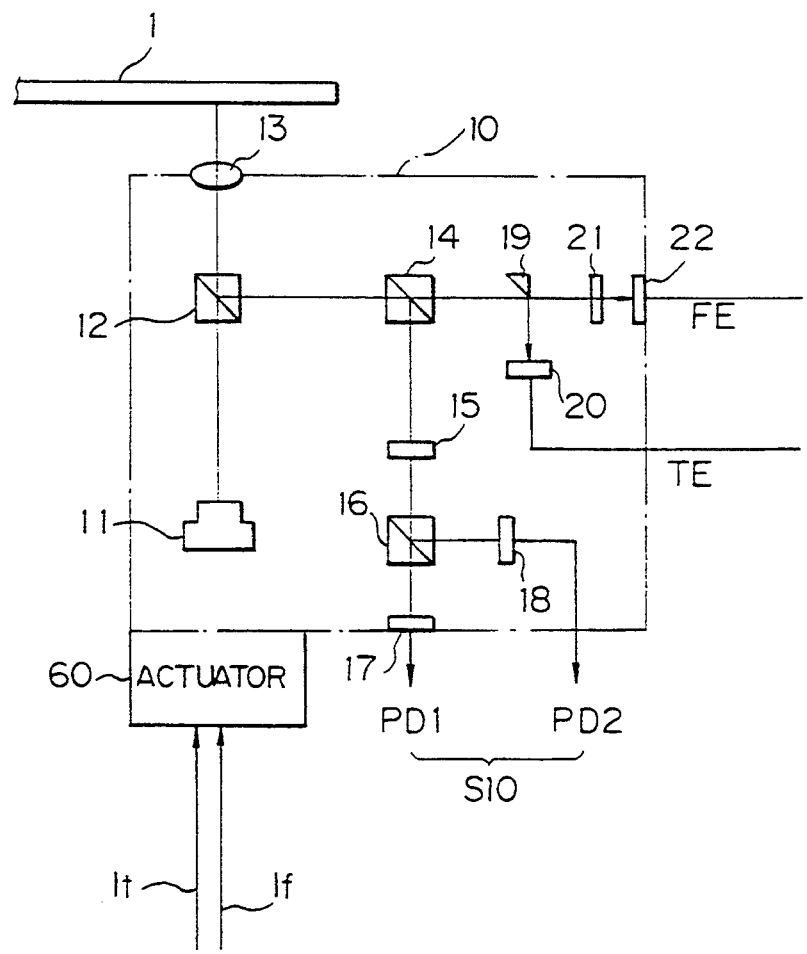
FIG. 1 schematically shows an optical pickup included in an optical data recording/reproducing apparatus embodying the present invention.

Preferred embodiments of the present invention will be described with reference to the accompanying drawings. In the figures, the same or similar components and structural elements are designated by like reference numerals, and redundant description will be avoided for simplicity.

Figure 2:
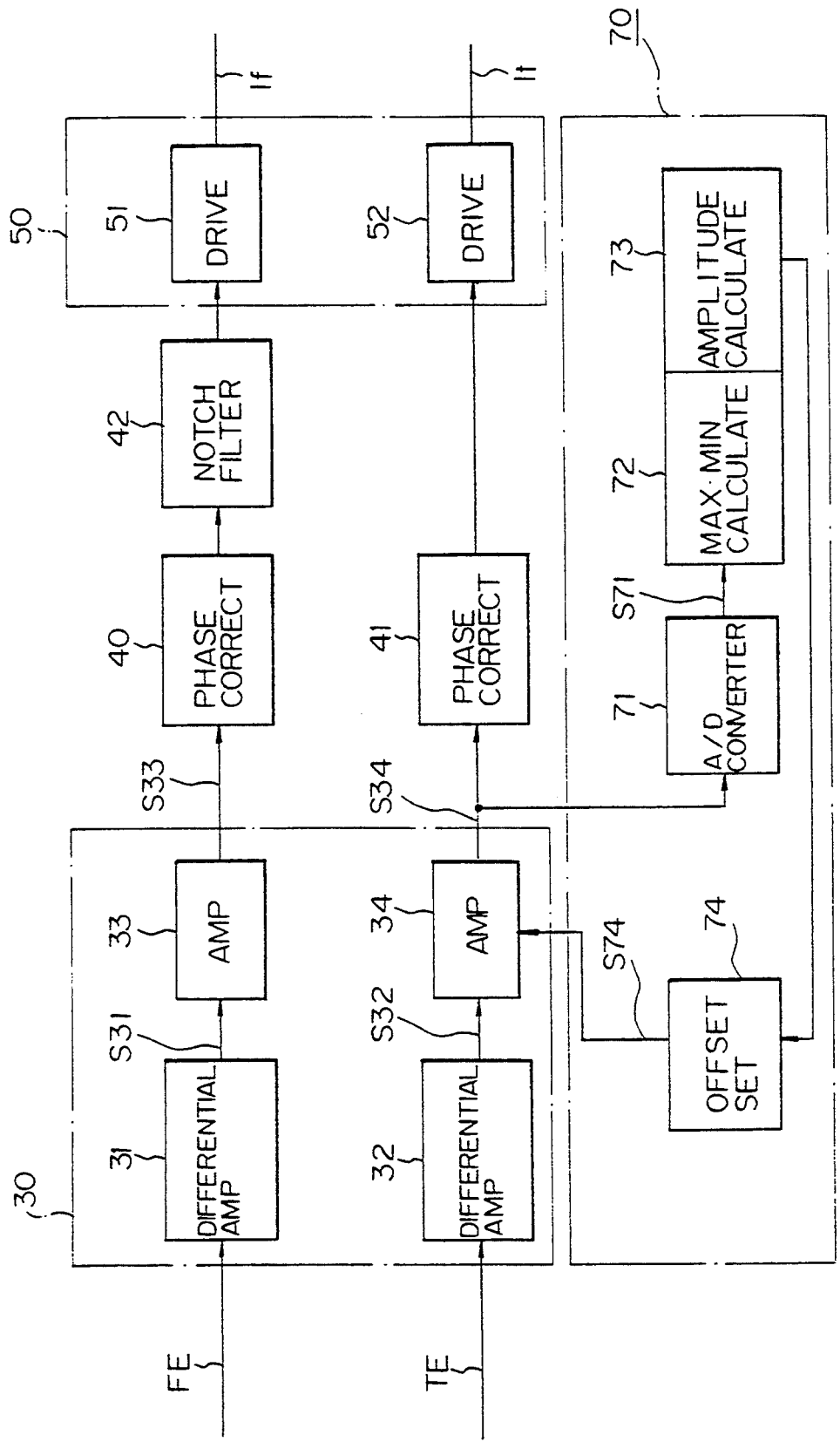
FIG. 2 is a block diagram schematically showing a preferred embodiment of an optical data recording/reproducing apparatus in accordance with the present invention.

Referring to FIGS. 1 and 2, a photomagnetic disk apparatus embodying the present invention and belonging to a family of optical data recording apparatuses is shown. As shown, the apparatus has an optical pickup 10 located in close proximity to an optical disk 1 which is driven by a spindle motor or similar drive source, not shown. The pickup 10 emits a light beam onto the disk 1, produces signals FE and TE joining in, respectively, focusing servo control and tracking servo control in response to a reflection from the disk 1, and outputs sensed signals PD1 and PD2 representative of data read out of the disk 1. The pickup 10 is made up of a semiconductor laser 11, beam splitters 12 and 14, an objective lens 13, a ¼ wavelength plate 15, a polarizing beam splitter 16, photodetectors 17 and 18 for outputting respectively the sensed signals PD1 and PD2, a laser mirror 19, a two-part type or similar photodetector 20 for outputting the tracking servo control signal TE, a cylindrical lens (plano-concave lens) 21, and a two-part type or similar photodetector 22 for outputting the focusing serve control signal FE.

As shown in FIG. 2, a servo error signal generating section 30 is connected to the outputs of the photodetectors 20 and 22. Receiving the signals TE and FE from the photodetectors 20 and 22, the servo error signal generating section 30 generates and amplifies servo error signals adapted for a focusing servo and a tracking servo, i.e., focus error signals S31 and S33 and tracking error signals S32 and S34. Specifically, this section 30 has a differential amplifier 31 for generating a focus error signal S31 in response to the input signal FE, a differential amplifier 32 for generating a tracking error signal S32 in response to the input signal TE, an amplifier 33 for amplifying the focus error signal S31 to produce an amplified focus error signal S33, and an amplifier 34 for amplifying the tracking error signal S32 to output an amplified tracking error signal S34.

A driving section 50 is connected to the output of one of the above-mentioned amplifiers 33 via a phase correcting circuit 40 and a notch filter, or narrow band filter, 42. The phase correcting circuit 40 compensates for a phase delay or a phase lead, while the notch filter 42 serves to eliminate higher-order focus resonance. The driving section 50 is also connected to the output of the other amplifier 34 via a phase correcting circuit 41.

The driving section 50 has a first and a second driving unit 51 and 52 assigned to focusing control and tracking control, respectively. The driving unit 51 produces a focusing drive current If by the voltage-to-current conversion of the output of the notch filter 42. The other driving unit 52 produces a tracking drive current It by the voltage-to-current conversion of the output of the phase correcting circuit 41. An actuator 60, FIG. 1, carrying the optical pickup 10 therewith is connected to the output of the driving section 50. The actuator 60 moves the objective lens 13 in the focusing direction, i.e., a direction substantially perpendicular to the general plane of the disk 1 by an exclusive coil, not shown, which is responsive to the focusing drive current If. At the same time, the actuator 60 moves the pickup 10 in the radial direction or tracking direction of the disk 10, i.e., a direction substantially perpendicular to the tracks of the optical disk 1.

A servo gain adjusting section 70 which is a characteristic feature of the illustrative embodiment is connected to the amplifier 34 which is included in the servo error signal generating section 30. The servo gain adjusting section 70 detects the maximum and minimum amplitudes of the tracking error signal S34 which appears at the start of the focusing servo control and when only the focusing servo control is effective. Based on the difference between the detected maximum and minimum amplitudes of the tracking error signal S34, the servo gain adjusting section 70 adjusts the tracking servo gain automatically.

The servo gain adjusting section 70 has an analog-to-digital (A/D) converter 71 for converting the tracking error signal S34 which is an analog signal, for example, into a digital signal. A maximum and minimum value (MAX.MIN) calculating unit 72 includes a maximum value register and a minimum value register, not shown, and calculates the maximum and minimum values of the digital tracking error signal S71 which is fed thereto from the A/D converter 71. An amplitude calculating unit 73 produces a difference between the maximum and minimum values of the tracking error signal S71 in response to the output of the MAX.MIN calculating unit S72 and then produces a difference between the resulted difference and a predetermined reference amplitude. A gain setting unit 74 is implemented by a digital-to-analog (D/A) converter, for example, and delivers to the amplifier 34 an output signal S74 thereof for setting a tracking servo gain on the basis of the output of the amplitude calculating unit 73. The calculating units 72 and 73 stated above may be implemented as calculators or similar independent circuits or by program control stored in a CPU (Central Processing Unit).

Figure 3:
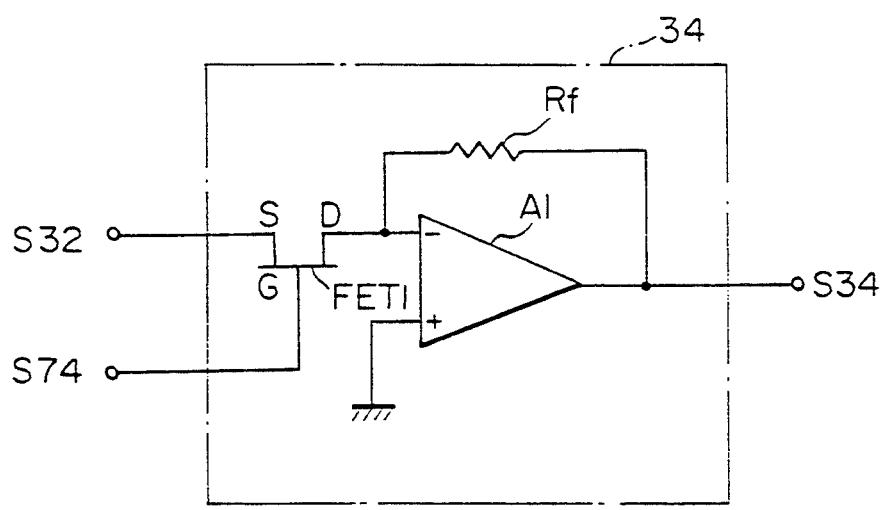
FIG. 3 is a circuit diagram showing a specific construction of an amplifier included in the embodiment of FIG. 2.

FIG. 3 is a circuit diagram showing a specific construction of the amplifier 34, FIG. 1, which contributes to tracking servo control. As shown, the circuit has an operational amplifier (OP AMP) A1, a field effect transistor (FET) 1 which gates the tracking error signal S32 under the control of the output S74 of the gain setting unit 74, and a feedback resistor Rf. The noninverting input of the OP AMP A1 is connected to ground, for example. In this configuration, the resistance Rsd1 between the source (S) and the drain (D) of the FET 1 and, therefore, the amplification factor changes in accordance with the input signal S74.

In operation, the light beam issuing from the semiconductor laser 11 included in the pickup 10 is propagated through the beam splitter 12 and then focused onto the disk 1 by the objective lens 13. The resultant reflection from the disk 1 is transmitted through the objective lens 13 and beam splitter 12 and then separated by the beam splitter 14 into a beam for servo control and a signal for signal sensing. The beam for signal sensing is routed through the ¼ waveform plate 15 to the polarizing beam splitter 16 to be thereby separated into a photomagnetic signal S10a and an ID signal S10b (see FIG. 15) which are the sensed signals S10. The signals S10a and S10b are incident to the photodetectors 17 and 18, respectively.

Figure 15:
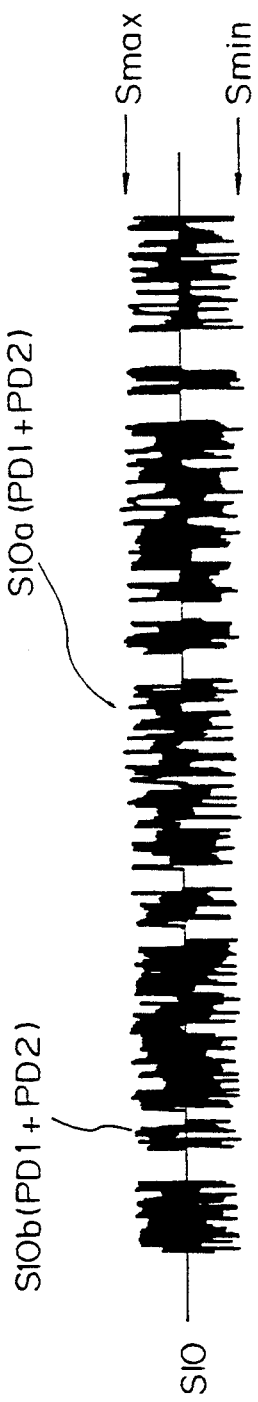
FIG. 15 plots a specific waveform of a signal read out of a disk when the tracking servo is effective in the embodiment.

Sensed signals PD1 and PD2 outputted by the photodetectors 17 and 18, respectively, are added (PD1+PD2) to reproduce the ID signal S10b, FIG. 15. The ID signal S20b is representative of track addresses, sector addresses and other similar information which are recorded in the form of pits in the disk 1 beforehand. On the other hand, a difference between the sensed signals PD1 and PD2 (PD1−PD2) is determined to reproduce the photomagnetic signal S10a, as also shown in FIG. 15. Regarding the signal S10a, data represented by the directions of magnetization are recorded in the form of pits in the recording layer of the disk 1, and the directions of magnetization, i.e., (logical) ZEROs and ONEs are reproduced by the Kerr effect.

The light beam for servo control also coming out of the beam splitter 14 of the pickup 10 is separated by the laser mirror 19 into a beam for tracking control and a beam for focusing control. The tracking beam is incident to the two-part type photodetector 20. The focusing beam is incident to the two-part type photodetector 22 via the cylindrical lens 21. The photodetectors 20 and 22 output respectively the signals TE and FE adapted for tracking servo control and focusing servo control, as stated earlier. The signals TE and Fe are delivered to the OP AMPs 31 and 32, respectively. In response, the OP AMPs 31 and 32 produce a focus error signal S31 and a tracking error signal S32, respectively. The amplifier 33 amplifies the focus error signal S31 to produce an amplified focus error signal S33. The amplified focus error signal S33 is corrected in phase by the phase correcting circuit 40 and then applied to the drive unit 51 via the notch filter 42 which eliminates higher-order focus resonance. The drive unit 51 converts the output voltage of the notch filter 42 into the previously mentioned focusing drive current If and feeds it to the actuator 60. In response, the actuator 60 executes focusing control by moving the lens 13 upward or downward by the drive coil, not shown.

The tracking error signal S32 from the other amplifier 32 is amplified by the amplifier 34. The resulted amplified tracking error signal S34 is corrected in phase by the phase correcting circuit 41 and then subjected to voltage-to-current conversion by the drive unit 52. As a result, the drive unit 52 produces the previously mentioned tracking drive current It. The actuator 60 is also driven by this current It to execute tracking control.

By the above-described procedure, the objective lens 13 is so displaced in the focusing direction as to focus the light beam accurately onto the disk 1 in matching relationship to the oscillation of the disk 1 which occurs in the up-and-down direction as viewed in a side view due to the rotation of the disk 1. At the same time, tracking is effected across the tracks which are formed on the disk 1 beforehand by prestamping. In this condition, the focusing and tracking servosystems are operated in such a manner as to minimize the focus error signal S31 and tracking error signal S32 during the recording or reproduction of data.

Figure 4:
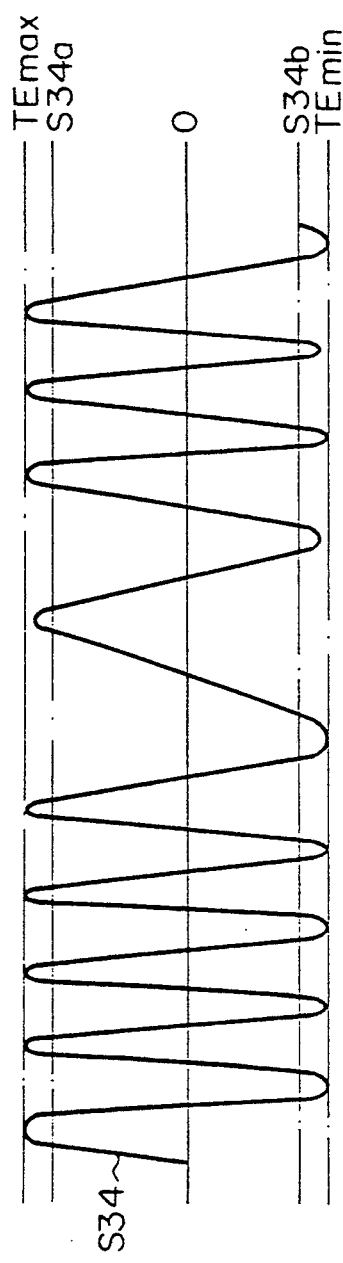
FIG. 4 plots a specific waveform of a tracking error signal appearing when only the focus servo is effective in the embodiment.
Figure 5:
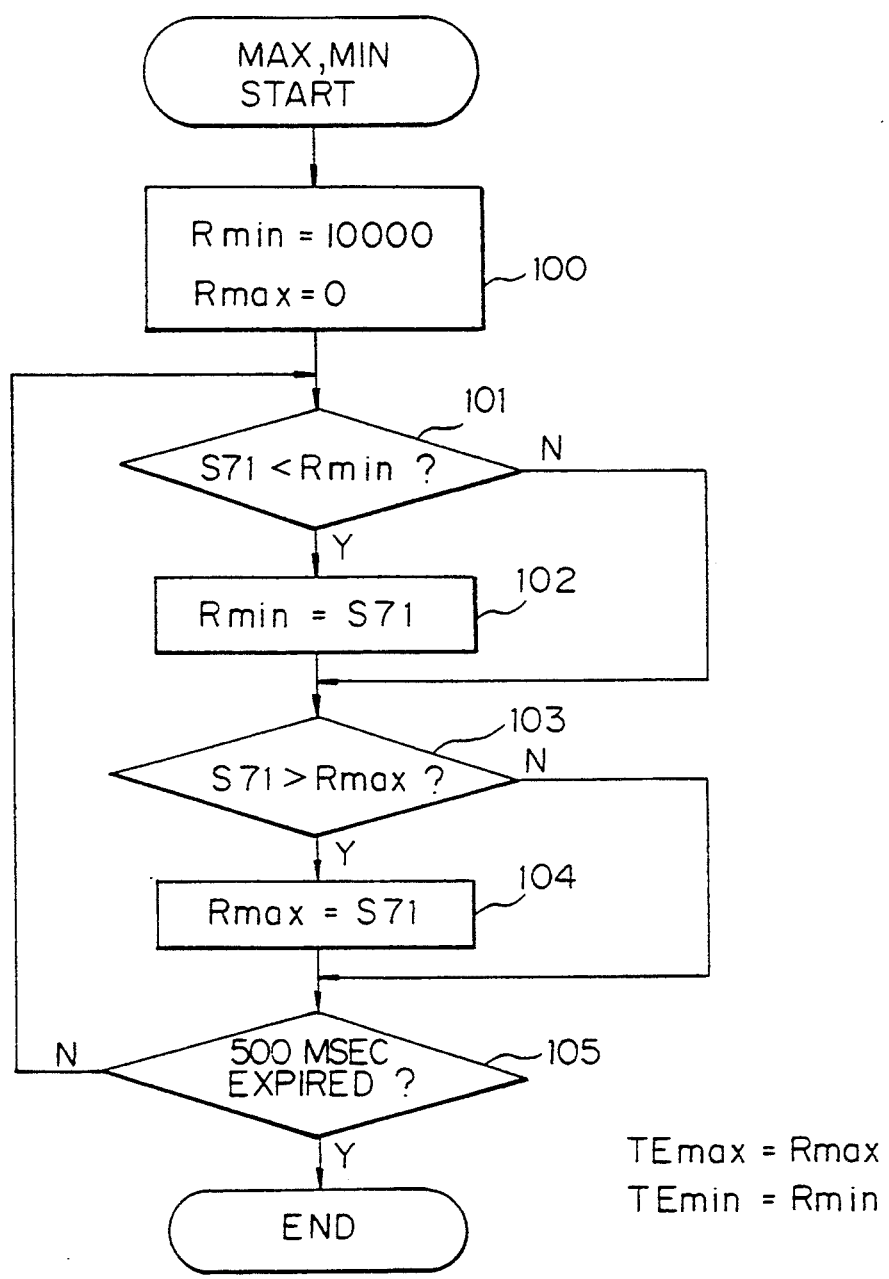
FIG. 5 is a flowchart representative of a maximum and minimum calculation procedure executed in the embodiment.
Figure 6:
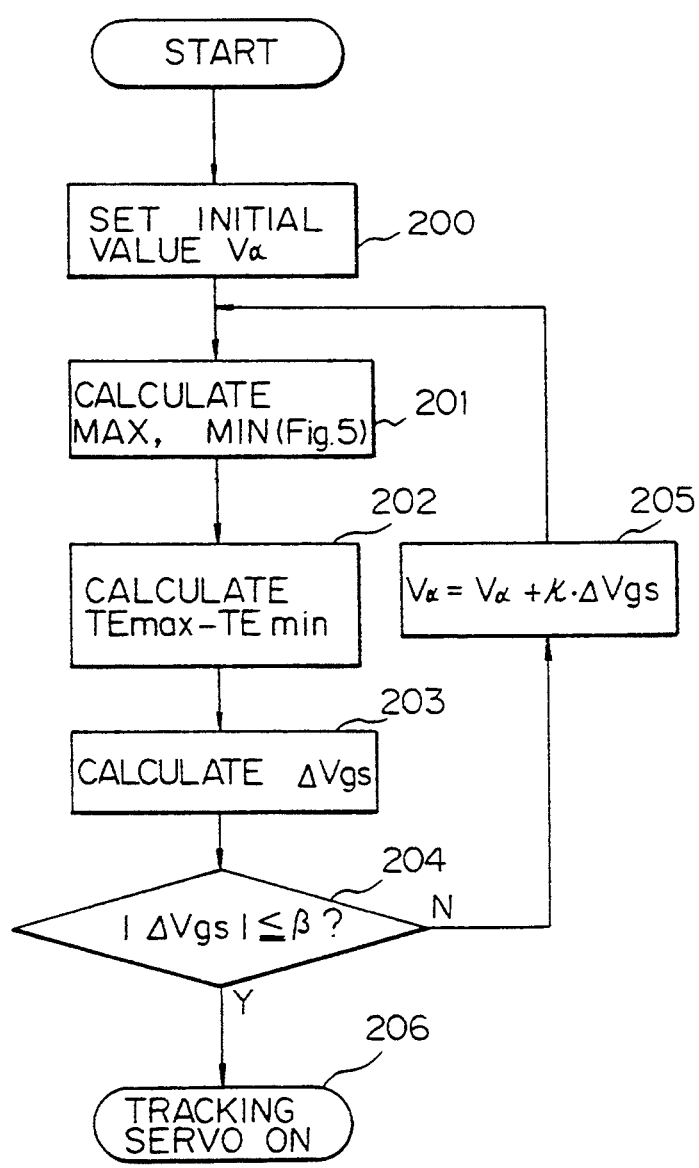
FIG. 6 is a flowchart demonstrating a tracking serve gain setting procedure also executed in the embodiment.

A reference will be made to FIGS. 4, 5 and 6 for describing the automatic adjustment of tracking servo gain. FIG. 4 shows a specific waveform of the tracking error signal S34 appearing when only the focus servosystem is effective. FIG. 5 is a flowchart demonstrating a specific sequence of steps in which the servo gain adjusting section 70, FIG. 2, calculates the maximum and minimum values. FIG. 6 is a flowchart showing a specific procedure for setting a tracking servo gain.

As shown in the figures, when the power source of the apparatus is applied or when the disk 1 is loaded on the apparatus, the optical pickup 10 is moved to a home position thereof by the actuator 60 while the disk 1 is caused to rotate. Then, a focus searching operation is executed in response to a control signal which is fed from a CPU or similar controller, not shown, so that only the focus servosystem is rendered effective. At this instant, the tracking error signal S34 being outputted by the amplifier 34 traverses several tens of tracks or so since the tracks of the disk 1 are usually eccentric with respect to the center of rotation of the disk 1. As a result, the tracking error signal S34 oscillates between the maximum amplitude TEmax and the minimum amplitude TEmin, as shown in FIG. 4.

On receiving the tracking error signal S34, the servo gain adjusting section 70 converts it into a digital signal by the A/D converter 71. The MAX.MIN calculating unit 72 determines the maximum value (TEmax, FIG. 4) and the minimum value (TEmin, FIG. 4) of the output of the A/D converter 71, i.e., a digital tracking signal S71, as FIG. 5 indicates. More specifically, the procedure shown in FIG. 5 begins with a step 100 in which a predetermined initial value such as "10000" and a predetermined initial value such as "0" are respectively set in a minimum and a maximum value register Rmin and Rmax built in the calculating unit 72. Then, a determination is made as to whether or not the value of the tracking error signal S71 smaller than the content of the minimum value register Rmin is (step 101). If the answer in step 101 is positive, i.e. Y, the content of the register Rmin is replaced with the value of the tracking error signal S71 (step 102). If the value of the tracking signal S71 is greater than that of the register Rmin (N, step 101), the content of the register Rmin is not updated.

Subsequently, a determination is made as to whether or not the value of the tracking error signal S71 is greater than the content of the maximum value register Rmax (step 103). If the answer in step 103 is positive, i.e. Y, the content of the register Rmax is replaced with the value of the tracking error signal S71. If otherwise (N, step 103), the content of the register Rmax is not updated.

The procedure described so far is repeated by way of a step 105 for 500 milliseconds or so to determine the maximum and minimum values. Repeating the calculations for 500 milliseconds as mentioned above, i.e., while the disk 1 rotates several consecutive rotations is desirable since the number of waves of the tracking error signal S34 usually differs from one disk to another due to the differences in disk eccentricity. Nevertheless, a period of time shorter than 500 milliseconds may be selected, if desired.

The calculation of the maximum and minimum values described above is followed by the operation for setting a tracking servo gain which is effected by the amplitude calculating unit 73. This operation will be described with reference to FIG. 6.

As shown in FIG. 6, the amplitude calculating unit 73 initializes the gain setting unit, or D/A converter, 74 by setting an initial value $V\alpha$ therein (step 200). Then, the output signal S74 of the gain setting unit 74 is fed to the gate (G) of the FET 1 included in the amplifier 34, FIG. 3, whereby the amplification factor of the amplifier 34 is set. Subsequently, the MAX.MIN calculating unit 72 determines the maximum and minimum values of the tracking error signal S71 at the initial value $V\alpha$ (step 201). The amplitude calculating unit 73 subtracts the minimum value TEmin from the maximum value TEmax (step 202) and then compares the resultant difference with a reference amplitude Vgs to produce a difference or error $\Delta$Vgs, i.e., Vgs−(TEmax−TEmin) (step 203). A determination is made as to whether or not the absolute value of the error $\Delta$Vgs is equal to or smaller than a threshold $\beta$ (step 204). If the answer in step 204 is negative, i.e. N, the value set in the D/A converter of the gain setting unit 74 is corrected by $V\alpha = V\alpha + \kappa \Delta Vgs$ (where $\kappa$ is a constant greater than 0 and smaller than 1), and the corrected value is set again in the D/A converter (step 205).

The output signal S74 set again in the D/A converter of the gain setting unit 74 as stated above is fed to the gate (G) of the FET 1 of the amplifier 34. The resistance of the FET 1 varies with the gate voltage. Specifically, as the gate voltage rises, the resistance sd1 between the source (S) and the drain (D) and, therefore, the input resistance of the amplifier 34 falls, resulting in the increase in the amplification factor Rf/Rsd. For example, assuming that the difference TEmax−TEmin of the tracking error signal S71 is smaller than the reference amplitude Vgs, then the error ΔVsg has a positive value and, therefore, the value Vα set again by the gain setting unit 74 is greater than the previous value Vα. Consequently, the value of the output signal S74, i.e., the gate voltage of the FET 1 increases with the result that the gain of the amplifier 34 is increased to increase the amplitude of the tracking error signal S34. This is repeated until the absolute value of the error ΔVgs becomes smaller than the threshold β. When an error ΔVgs smaller than the threshold β is obtained, it is determined that a reference tracking servo gain has been set. Then, the tracking servo is rendered effective (step 206). When the difference TEmax−TEmin of the tracking error signal S71 is greater than the reference amplitude Vgs, substantially the same operation as the operation stated above is performed so that, when it is determined that a reference tracking servo gain has been set, the tracking servo is rendered effective (step 206).

As stated above, although the amplitude of the tracking error signal may differ from one optical disk to another, the illustrative embodiment causes the servo gain adjusting section 70 to adjust the tracking servo gain automatically in a matching relationship to the amplitude of the tracking error signal particular to a disk on the turn-on of the power source or on the loading of the disk. This realizes a photomagnetic disk apparatus which is operable with various kinds of optical disks and excellent in portability (replaceability) and effects stable tracking servo control with a minimum of tracking error.

Figure 7:
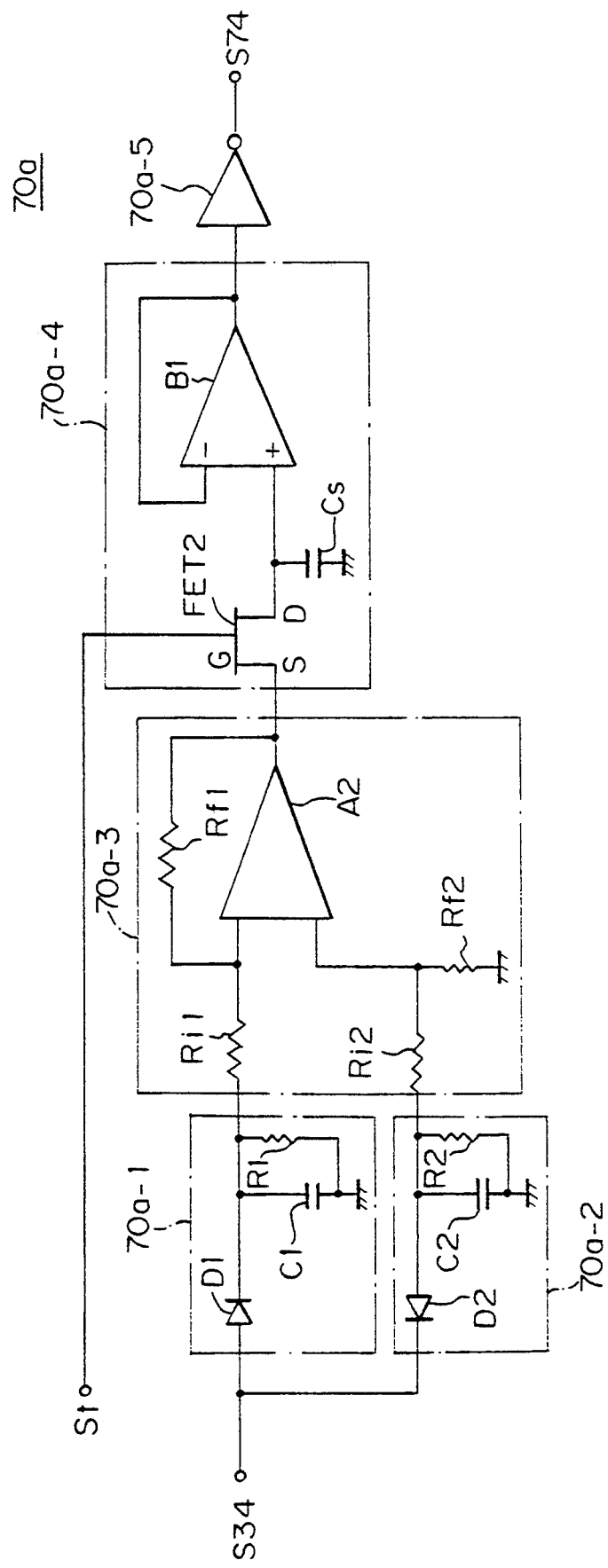
FIG. 7 is a functional block diagram schematically showing another specific construction of a servo gain adjusting section.

Referring to FIG. 7, there is shown a servo gain adjusting section 70a representative of an alternative embodiment of the present invention. The servo gain adjusting section 70a is a substitute for, for example, the servo gain adjusting section 70 shown in FIG. 2. The adjusting section 70a implements the digital function of the adjusting section 70 in an analog fashion and has a maximum amplitude detecting circuit 70a-1, a minimum amplitude detecting circuit 70a-2, a difference detecting circuit 70a-3, a sample and hold circuit 70a-4, and an inverter 70a-5.

The maximum amplitude detecting circuit 70a-1 has a diode D1, a capacitor C1, and a resistor R1 for rectifying and smoothing the maximum side of the waveform of the output tracking error signal S34. On the other hand, the minimum amplitude detecting circuit 70a-2 has a diode D2, a capacitor C2 and a resistor R2 for rectifying and smoothing the minimum side of the waveform of the tracking error signal S34. The resistors R1 and R2 may have the same resistance R, and the capacitors C1 and C2 may have the same capacitance C. The resistor R1 and capacitor C1 and the resistor R2 and capacitor C2 each has a smoothing time constant $T = R \times C$ which is, for example, more than ten times as great as one period of the tracking error signal S32 and smaller than the gain setting period of 500 milliseconds, e.g. about 100 milliseconds.

The difference detecting circuit 70a-3 has input resistors Ri1 and Ri2, a feedback resistor Rf1, a reference resistor Rf2, and an OP AMP A2. Let it be assumed that the input resistors Ri1 and Ri2 have the same resistance Ri while the feedback resistor Rf1 and reference resistor Rf2 have the same resistance Rf. The sample and hold circuit 70a-4 is made up of an FET 2 whose gate is controlled by a tracking servo ON signal St, a capacitor Cs, and a buffer B1. Further, the inverter 70a-5 may be implemented as an inverting amplifier.

The operation of the servo gain adjusting section 70a shown in FIG. 7 will be described with reference to FIG. 4. When the tracking error signal S34 is fed from the amplifier 34 to the servo gain adjusting section 70a, the maximum amplitude and minimum amplitude detecting circuits 70a-1 and 70a-2 hold the peaks of the signal S34 at the maximum side and the minimum side, respectively. As a result, the signals S34a and S34b are smoothed and held at the maximum side and the minimum side of the tracking error signal S34, respectively. At this time, the signals S34a and S34b have dropped by about 0.5 volt from TEmax and TEmin, respectively, due to the diodes D1 and D2. The smoothed signals S34a and S34b are applied to the amplitude detecting circuit 70a-3.

In response, the amplitude detecting circuit 70a-3 causes the OP AMP A2 thereof to subtract the value of the signal S34b from the value of the signal S34a and thereby produce a difference TEmax−TEmin. The resultant difference is transferred to the sample and hold circuit 70a-4. While the tracking servo is not effective, the tracking servo ON signal St applied to the sample and hold circuit 70a-4 remains at a high level. In such a condition, the resistance Rsd2 between the source (S) and the drain (D) of the FET 2 is several tens of ohms to several hundred ohms, so that the output value of the OP AMP A2 is stored as a charge in the capacitor Cs. As the tracking servo becomes effective, the tracking servo ON signal St goes low with the result that the resistance Rsd2 of the FET 2 is increased to several megohms. Consequently, the output valve of the OP AMP A2 having been stored in the capacitor Cs is held and applied as an output signal S74 to the gate (G) of the FET 1 of the amplifier 34 via the inverter 70a-5. The gate voltage of the FET 1 and, therefore, the amplification factor of the amplifier 34 varies with the value of the signal S74. As a result, the tracking servo is effected with the tracking servo gain being automatically adjusted.

In the embodiment shown in FIG. 7, the amplification factor Rf/Ri set in the OP AMP A2 corresponds to the reference amplitude Vgs of the servo gain adjusting section 70, FIG. 2. As the amplification factor Rf/Ri increases, the amplification factor of the amplifier 34 and, therefore, the tracking servo gain decreases. The reference amplitude is, therefore, determined by the amplification factor Rf/Ri of the OP AMP 42.

It will seem that the servo gain adjusting section 70a described above implements the automatic digital tracking servo gain adjustment particular to the adjusting section 70, FIG. 2, in an analog fashion and, yet, achieves advantages comparable with those of the latter. Another advantage of the alternative embodiment is that it does not need program processing and, therefore, realizes high-speed processing.

The present invention is not limited to the illustrative embodiments and may be modified without departing from the scope thereof. For example, the servo gain adjusting section 70 or 70a each may have the FET 1 or FET 2 thereof replaced by an ordinary bipolar transistor. Even the optical pickup 10 shown in FIG. 1 and/or the servo error signal generating section 30 shown in FIG. 2 may be provided with any other suitable circuit arrangement. While the illustrative embodiments have been shown and described in relation to a photomagnetic disk, they are similarly applicable to a broad range of optical disk apparatuses such as an addition type and a player type optical disk apparatus.

As described above, the illustrative embodiments each has a servo gain adjusting section which detects the maximum and minimum values, or values close thereto, of a tracking error signal at the beginning of focus servo which occurs after the turn-on of the power source or the loading of a disk. Then, the adjusting section produces a difference between the two detected values so as to control the tracking servo gain automatically on the basis of the difference. Hence, despite the fact that recording media in the form of disks differ in the depth, shape and other physical conditions of tracks and, therefore, in the amplitude of the resulting retracking error signal, the tracking servo gain is automatically controlled in a matching relationship to a particular medium. This allows the embodiments to operate with various kinds of optical recording media and implements stable tracking servo control with a minimum of tracking error.

Figure 8:
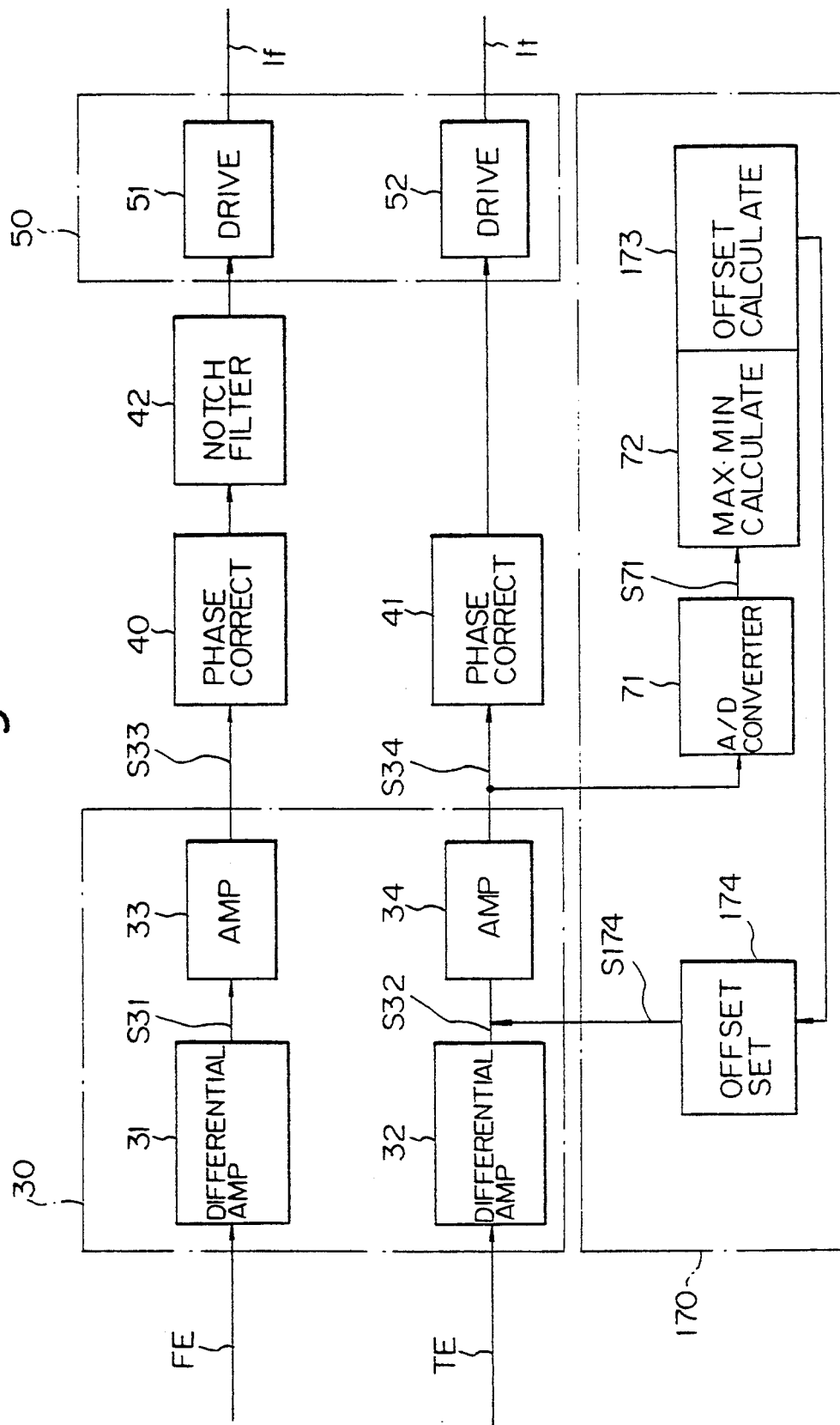
FIG. 8 is a block diagram similar to FIG. 1, schematically showing an alternative embodiment of the present invention.

Referring to FIG. 8, another alternative embodiment of the present invention is shown which eliminates the occurrence that the tracking servo is disturbed by the differences in tracking offset among different kinds of optical disks. This embodiment is similar to the embodiment of FIG. 2 except that a servo offset adjusting section 170 is provided in place of the servo gain adjusting section 70. Briefly, the servo offset adjusting section 170 detects the maximum and minimum values, or values close thereto, of the tracking error signal at the start of the focus servo control and adjusts the offset of the tracking servo on the basis of the sum or the mean value of the maximum and minimum values.

In the illustrative embodiment, after the turn-on of the power source or the disk loading, the optical pickup 10, for example, is returned to the home position thereof in the radial direction of the optical disk 1. When only the focus servo control is begin with the disk 1 begun rotated, the servo offset adjusting section 170 detects the maximum and minimum values, or values close thereto, of the tracking error signal, and sums or averages the detected values, and then sets a tracking offset on the basis of the resultant sum or mean value. This is successful in adjusting the tracking offset automatically in a matching relationship to a particular kind of disk used, insuring accurate recording or playback.

The servo offset adjusting section 70 which is a characteristic feature of the embodiment is connected to the amplifier 34. When the focus servo control is begun, the servo offset adjusting section 170 detects the maximum and minimum amplitudes of the tracking error signal S34 which appear when only the focus servo control is effective. The adjusting section 170 adds the maximum and minimum values and adjusts the tracking offset automatically by using the resultant sum.

Specifically, the servo offset adjusting section 70 has an offset calculating unit 173 for producing a sum or a mean value of the maximum and minimum values of the tracking error signal S71 in response to the output of the MAX.MIN calculating section 72 for then determining a difference between the sum or the mean value and a predetermined reference offset. An offset setting unit 74 is implemented by a D/A converter, for example, and produces a signal S174 in response to the output of the offset calculating unit 173. The signal S174 is applied to the amplifier 34 for setting a tracking offset. The MAX.-MIN calculating section 72 and amplitude calculating section 73 may be constituted by calculators or similar independent circuits or may be implemented by a program control stored in a CPU.

Figure 9:
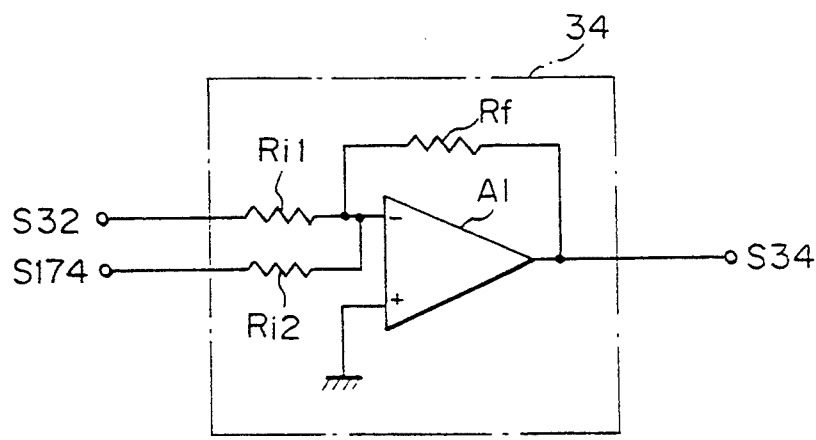
FIG. 9 is a circuit diagram showing a specific construction of an amplifier included in the embodiment of FIG. 8.

FIG. 9 shows a specific construction of the amplifier 34 joining in the tracking servo control and applicable to the embodiment shown in FIG. 8. As shown, the amplifier 34 is made up of an OP AMP A1, an input resistor Ri1 to which the tracking error signal S32 is applied, an input resistor Ri2 to which the output S74 of the offset setting unit 74 is applied, and a feedback resistor Rf. The noninverting input of the OP AMP A1 is connected to ground, for example.

In operation, on receiving the tracking error signal S34, the servo offset adjusting section 170 causes the A/D converter 71 to convert the signal S34 into a digital signal. The resultant digital tracking error signal S71 is fed to the MAX.MIN calculating unit 72. In response, the calculating unit 72 calculates the maximum value (TEmax, FIG. 10) and the minimum value (TEmin, FIG. 10) of the digital tracking error signal S71, according to the procedure shown in FIG. 5. Thereafter, the offset calculating unit 173 executes processing for setting a tracking offset. This processing will be described with reference to FIG. 11 hereinafter.

Figure 11:
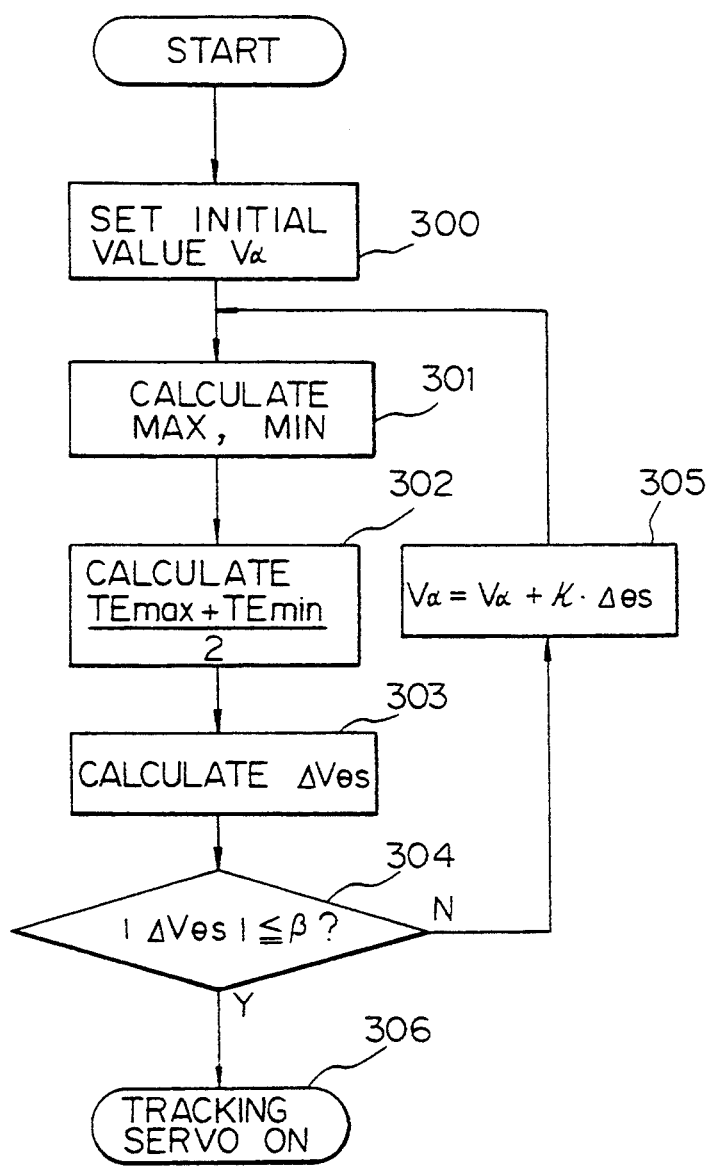
FIG. 11 is a flowchart demonstrating a tracking offset setting procedure particular to the alternative embodiment.

As shown in FIG. 11, the procedure begins with a step 300 in which the offset calculating unit 173 sets an initial value $V\alpha$ in the offset setting unit of D/A converter 174. Then, the output S174 of the offset setting unit 174 is fed to the input resistor Ri2 of the amplifier 34, FIG. 9. In response, the amplifier 34 changes the DC level of the tracking error signal S34 which it outputs, whereby an initial tracking offset is set up. Subsequently, the MAX.MIN calculating unit 72 calculates the maximum and minimum values of the tracking error signal S71 at the initial value $V\alpha$ (step 301). The offset calculating unit 173 produces, for example, a mean value of the calculated maximum and minimum values, i.e., (TEmax+TEmin)/2 (step 302). The mean value may be replaced by a sum (TEmax+TEmin) of the two values, if desired. In a broad sense, therefore, the word "sum" which appear in the specification should be understood to include a mean value as well. The offset calculating unit 173 compares the mean value (TEmax+TEmin)/2 with a reference offset $V\theta s$ to produce a difference or error $\Delta V\theta s$ (step 303). If the reference offset is 0 volt, for example, the error $\Delta V\theta s$ will be (TEmax+TEmin)/2. A determination is made as to whether value of the error $\Delta V\theta s$ is equal to or smaller than a predetermined threshold $\beta$ (step 304). If the answer of the step S304 is negative, i.e. N, the value set in the D/A converter of the offset setting unit 174 is corrected by $V\alpha = V\alpha + \kappa \Delta V\theta s$ (where $\kappa$ being a constant greater than 0 and smaller than 1), and the corrected value is set again in the unit 174. The resultant output S174 of the offset setting unit 174 is fed to the input resistor Ri2 of the amplifier 34 shown in FIG. 9.

Figure 10:
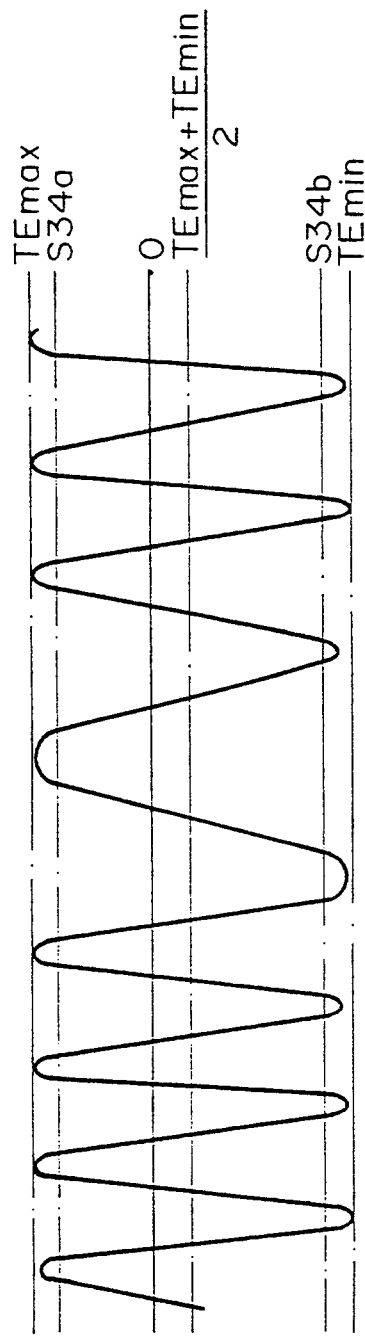
FIG. 10 plots a specific waveform of a tracking error signal appearing when only the focus servo is effective in the alternative embodiment.

As shown in FIG. 10, assume that the waveform of the tracking error signal S34 is deviated to the negative side. Then, the center of the waveform of the tracking error signal S34 becomes smaller than the reference offset (=0 volt) and thereby renders the error $\Delta V\theta s$ negative. As a result, the value $V\alpha$ ($=V\alpha+\kappa\Delta V\theta s$) set again in the D/A converter of the offset setting unit 174 is smaller than the previous value $V\alpha$. This lowers the DC level of the output signal S174 and thereby raises the DC level of the tracking error signal S34 which is the output of the amplifier 34. As such a procedure is repeated until the absolute value of $\Delta V\theta s$ becomes smaller than the threshold $\beta$, and it is determined that an adequate tracking offset has been set up, and the tracking servo is rendered effective (step 306).

When the center of the output waveform of the tracking error signal S34 is deviated to the positive side, the offset calculating section 173 executes substantially the same sequence of steps. The tracking servo is rendered effective when it is determined that an adequate tracking offset has been set up, step 306.

The illustrative embodiment has an advantage that although the tracking offset depends on the kind of photomagnetic disk used, the servo offset adjusting section 170 automatically adjusts the tracking offset of a particular disk used after the turn-on of the power source or at the beginning of disk loading. This is also successful in implementing a photomagnetic disk apparatus operable with a broad range of optical disks and excellent in portability (replaceability) while promoting stable tracking servo control with a minimum of tracking error.

Figure 12:
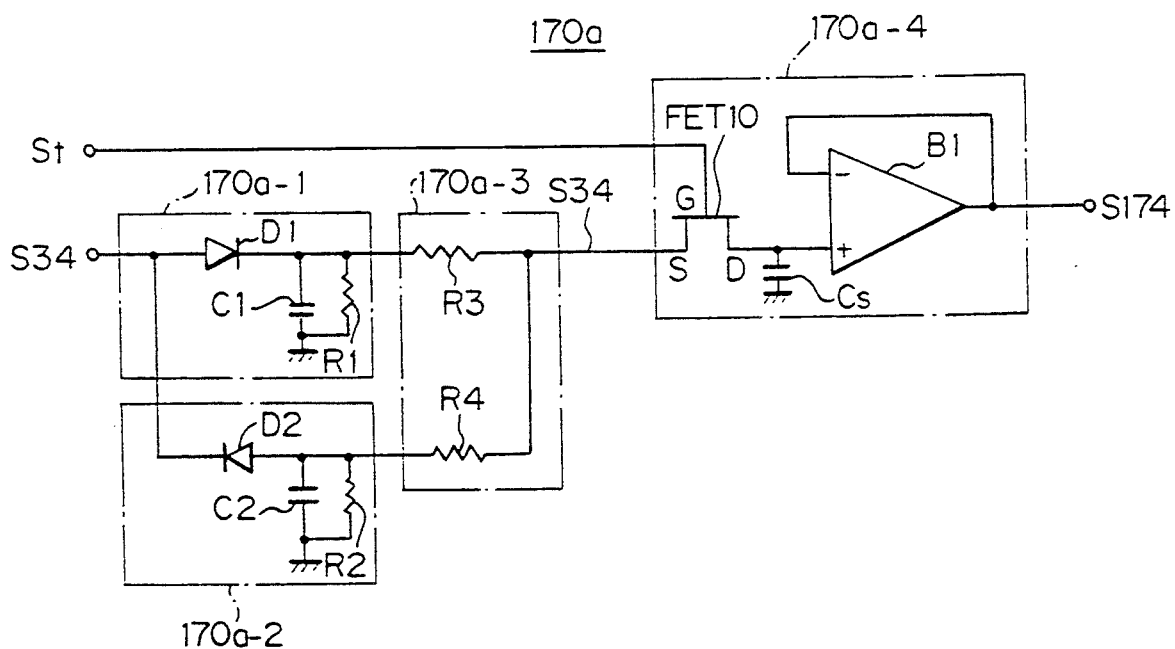
FIG. 12 is a functional block diagram schematically showing another specific construction of a servo offset adjusting section included in the alternative embodiment.

Referring to FIG. 12, a servo offset adjusting section 170a representative of another alternative embodiment of the present invention will be described. The servo offset adjusting section 170a is a substitute for, for example, the servo offset adjusting section 170 which has been described with reference to FIG. 8. The adjusting section 170a implements the digital function of the adjusting section 170 in an analog fashion and has a maximum amplitude detecting circuit 170a-1, a minimum amplitude detecting circuit 170a-2, an adding circuit 170a-3, and a sample and hold circuit 170a-4.

The maximum amplitude detecting circuit 170a-1 rectifies and smooths the maximum side of the output waveform of the tracking error signal S34 and is made up of a diode D1, a capacitor C1, and a resistor R1. The minimum amplitude detecting circuit 170a-2 rectifies and smooths the minimum side of the tracking error signal S34 and constituted by a diode D2, a capacitor C2, and a resistor R2. Let the resistors R1 and R2 have the same resistance R and the capacitors C1 and C2 have substantially the same capacitance C by way of example. Preferably, the resistor R1 and capacitor C1 and the resistor R2 and capacitor C2 each has a smoothing time constant $T=R\times C$ which is, for example, more than ten times as great as one period of the tracking error signal S34 and smaller than the offset setting period of 500 milliseconds, e.g. about 100 milliseconds. The adding circuit 170a-3 is implemented by resistors R3 and R4. The sample and hold circuit 170a-4 is comprised of an FET 10 gating the output of the adding circuit 170a-3 under the control of the tracking servo ON signal St, a capacitor Cs, and a buffer B1.

In operation, when the tracking error signal S34 is fed from the amplifier 34 to the servo offset adjusting section 170a, the maximum amplitude and minimum amplitude detecting circuits 170a-1 and 170a-2 hold the peaks of the tracking error signal S34 on the maximum side and minimum side, respectively. As a result, the signal S34a is smoothed and held on the maximum side of the tracking error signal S34, while the signal S34b is smoothed and held on the minimum side (see FIG. 10). The signals S34a and S34b each has been dropped by about 0.5 volt from TEmax or TEmin due to the associated diode D1 or D2. The smoothed signals S34a and S34b are applied to the adding circuit 170a-3.

In the adding circuit 170a-3, the resistors R3 and R4 add the values of the input signals S34a and S34b. Assuming that the resistors R3 and R4 have the same resistance, then the sum of the signals S34a and S34b is equal to (signal S34a+signal S34b)/2. As a result, a signal S34c having the sum, i.e., a value (TEmax+TEmin)/2 is applied to the source (S) of the FET 10. While the tracking servo control is not effective, the tracking servo ON signal St remains at a high level. In this condition, the resistance Rsd between the source (S) and the train (D) of the FET 10 is several tens to several hundred ohms so that the signal S34c having the value (TEmax+TEmin)/2 is fed to the capacitor Cs. When the tracking servo control is rendered effective, the tracking servo ON signal St goes high with the result that the resistance Rsd of the FET 10 increases to several megohms. Consequently, the value (TEmax+TEmin)/2 of the signal S34c having been charged is held, and the buffer b1 outputs a signal S174. This signal S174 is delivered to the input resistor Ri2, FIG. 9. As a result, a tracking offset is automatically adjusted in an analog fashion to effect tracking servo, as in the embodiment shown in FIG. 8.

In the manner described above, the servo offset adjusting section 170a implements the automatic digital tracking offset adjustment of the servo offset adjusting section 170 shown in FIG. 8 by an analog procedure and achieves substantially the same advantages as the latter. An additional advantage attainable with this alternative embodiment is that it is free from program processing and, therefore, operable at high speed.

The present invention is not limited to the embodiments shown and described, and various modifications will become possible for those skilled in the art without departing from the scope thereof. For example, the servo offset adjusting section 170 or 170a may have the FET 10 thereof replaced by an ordinary bipolar transistor. Even the optical pickup 10 shown in FIG. 1 and/or the servo error signal generating section 30 may be provided with any other suitable circuit arrangement. The present invention is applicable not only to a photomagnetic disk apparatus but also to other various types of optical disk apparatuses including an additional type apparatus and an exclusive playback type apparatus.

As stated above, the illustrative embodiments each has a servo offset adjusting section 170 or 170a which detects the maximum and minimum values, or values close thereto, of a tracking error signal at the start of the focussing servo control which occurs after the turn-on of the power source or after disk loading, and produces a sum or a mean value of the two values, and adjusts the tracking offset automatically on the basis of the sum or the mean value. Hence, despite the fact that the depth, shape and other physical conditions of tracks and, therefore, the tracking offset differ from one disk to another, the embodiment realizes automatic tracking offset adjustment in a matching relationship to a particular disk used. This is successful in implementing an optical data recording/reproducing apparatus which is operable with various kinds of optical disks and effects stable tracking servo with a minimum of tracking error.

Figure 13:
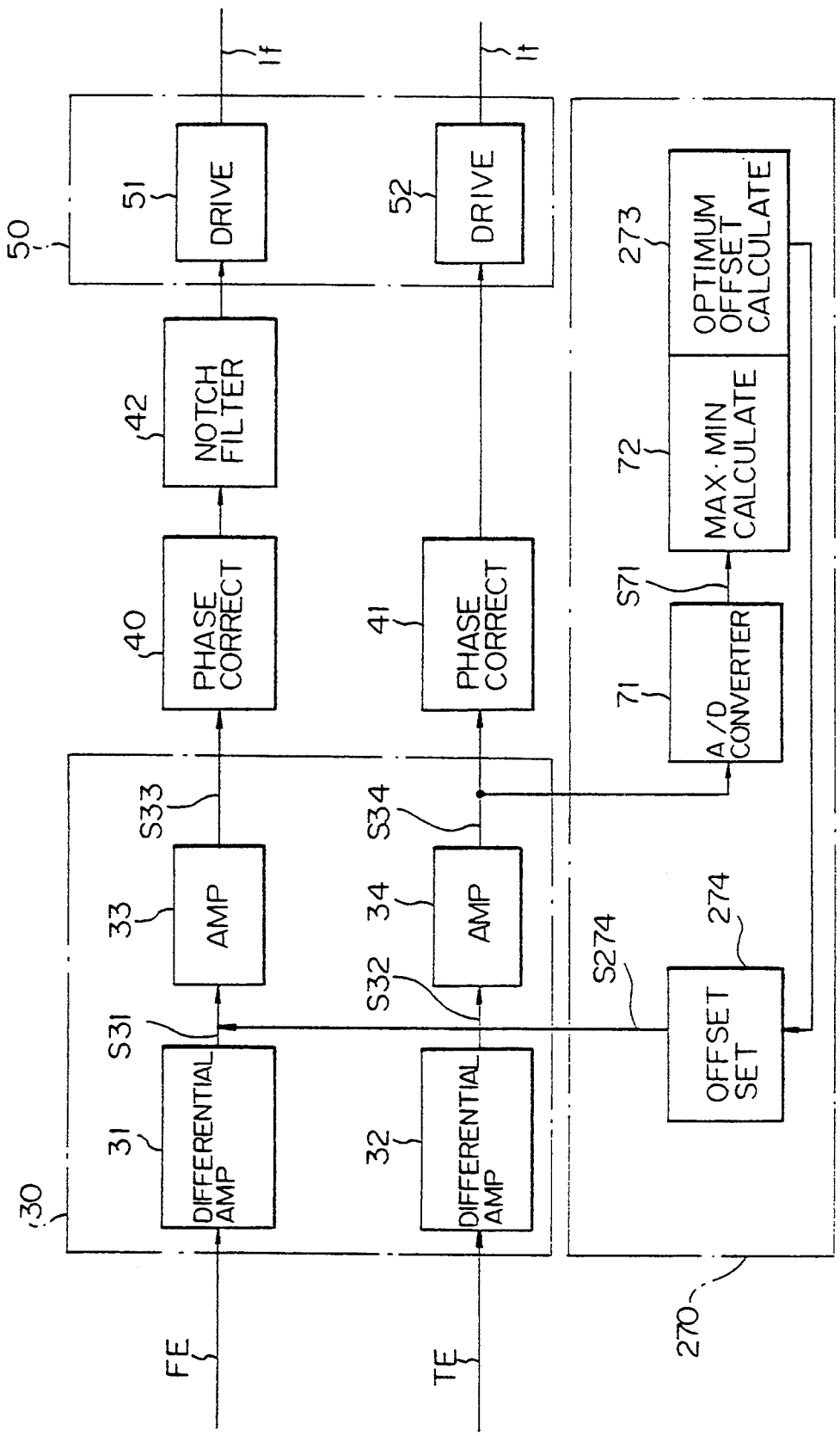
FIG. 13 is a block diagram similar to FIG. 1, schematically showing another alternative embodiment of the present invention.

Referring to FIG. 13, another alternative embodiment of the present invention is shown and implemented as an optical data recording/reproducing apparatus capable of readjusting the change in focus due to aging. As shown, the embodiment has a focus offset adjusting section 270. Briefly, in response to a signal for servo control appearing at the beginning of focus servo or a sensed data signal appearing after the start of tracking servo, the focus offset adjusting section 270 determines a focus offset associated with the maximum or substantially maximum amplitude of the signal and readjusts the offset of focus servo by the determined focus offset.

In the illustrative embodiment, at the start of the focus servo control which occurs after the turn-on of the power source or the loading of the disk 1 and with the optical pickup 10 having been located at the home position thereof and the disk being rotated, the focus offset adjusting section 270 detects the amplitudes of the signals adapted for focusing servo and tracking servo control or those of a sensed signal representative of recorded data. Then, the adjusting section 270 determines a focus offset at which the detected amplitude becomes maximum or substantially maximum and, based on the so determined focus offset, readjusts the focus servo offset. With the adjusting section 270, therefore, it is possible to automatically adjust the offset of focusing servo and to thereby insure accurate recording and playback over a long period of time.

Specifically, the focus offset adjusting section 270 is connected between the output of the amplifier 34 and the input of the amplifier 33. The adjusting section 270 automatically adjusts the focus servo offset, or focusing offset, such that the amplitude of the tracking error signal S34 appearing at the start of the focusing servo control and when only the focusing servo control is effective does the amplitude become; maximum or substantially maximum. As shown in FIG. 13, the adjusting section 270 has an optimal offset calculating unit 273 and an offset setting unit 274. The optical offset calculating unit 273 calculates an optimal focus servo offset in response to the output of the MAX.MIN calculating section 72. The offset setting unit 274 is implemented by a D/A converter and feeds, on the basis of the output of the calculating unit 273, an output signal S274 thereof to the amplifier 33 to set a focus servo offset. The MAX.-MIN calculating section 72 and optimal offset calculating section 273 may be constituted by calculators or similar independent circuits or may be implemented by a program control stored in a CPU.

Figure 14:
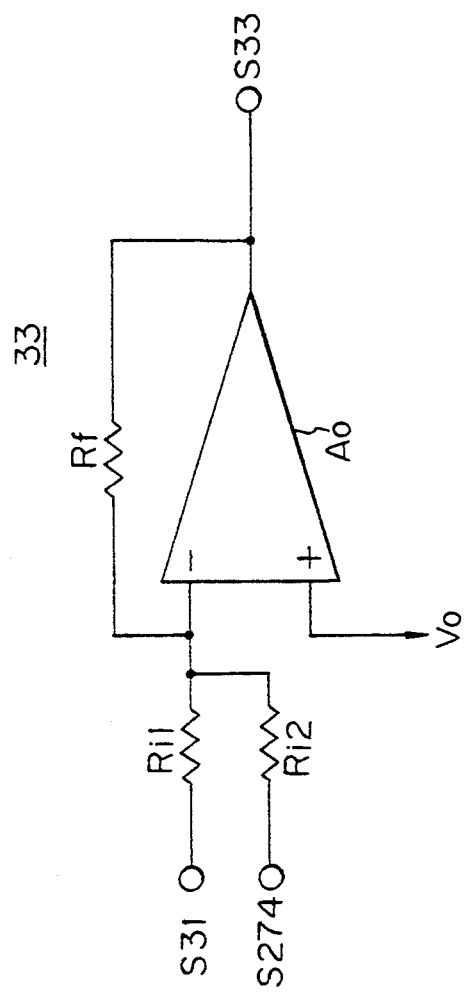
FIG. 14 is a circuit diagram showing a specific construction of an amplifier included in the embodiment of FIG. 13.

FIG. 14 shows a specific construction of the amplifier 33, FIG. 13, which joins in the focusing servo control function. As shown, the amplifier 33 is implemented as an inverting amplifier having an OP AMP Ao, an input resistor Ril to which the focus error signal S31 is applied, an input resistor Ri2 to which the output signal S274 of the offset setting section 74 is applied, and a feedback resistor Rf. A reference potential such as ground potential Vo is applied to the noninverting input of the OP AMP Ao. The offset changes in response to the output signal S274 of the offset setting section 274 which is fed to the input resistor Ri2.

FIG. 15 shows a specific waveform of the sensed signal S10 appearing when the tracking servo control is rendered effective. The sensed signal S10 includes a photomagnetic signal representative of data or pits recorded in the disk 1 as different directions of magnetization of a recording layer and reproduced in the form of the directions of magnetization, i.e., ONEs and ZEROs by Kerr effect. The sensed signal S10 also includes a preformat signal, or ID signal, S10$b$ representative of tracks addresses, sector addresses and other similar information recorded in the disk 1 in the form of pits. Signals Smax and Smin are indicative of, respectively, the maximum and minimum amplitudes of the sensed signal S10.

Figure 16:
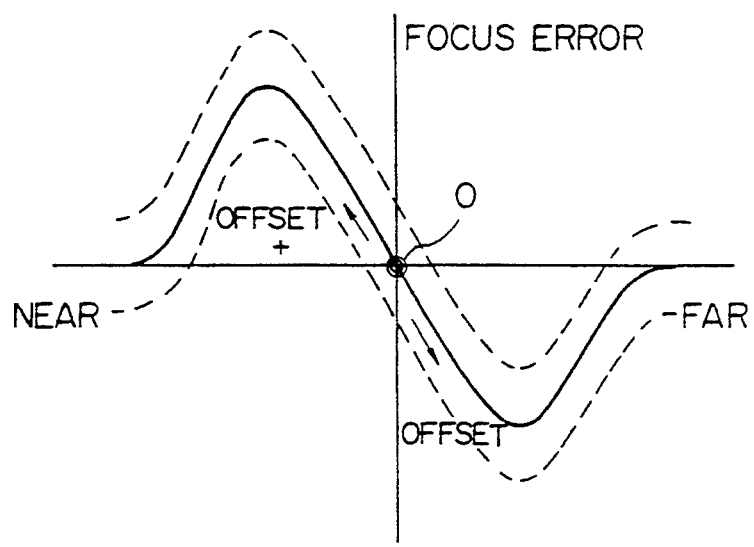
FIG. 16 indicates a relationship between the focus error and the distance from an optical disk.
Figure 17:
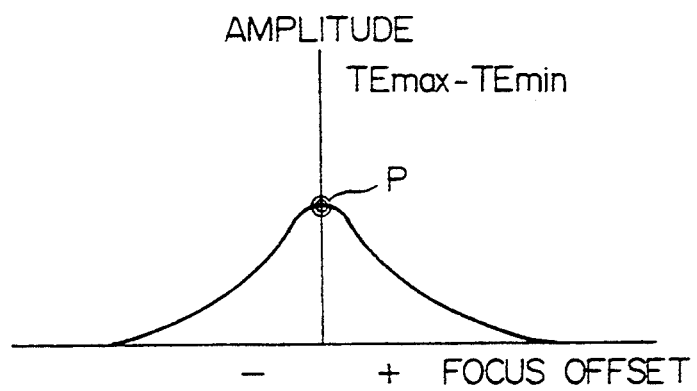
FIG. 17 indicates a relationship between the amplitude of a tracking error signal and the focus offset.

As shown in FIG. 16, when the objective lens 13 is moved up and down to opposite sides of a focus position O at the time of focus search, the focus error signal S33 changes up and down to opposite sides of the focus point O, as indicated by a solid curve in the figure. On the offset of the focus, the focus error signal S33 is deviated as represented by any one of broken curves specifically in the figure, causing the focus point O to deviate. Then, as FIG. 17 indicates, the amplitude of the tracking error signal S34 appearing when only the focus servo is effective sequentially falls from the peak P thereof which is defined at the focus position O. It follows that even when the focus is offset, it can be corrected if a focus servo offset, or focusing offset, is added to bring the amplitude of the tracking error signal S34 to the peak.

In operation, the A/D converter 71 included in the focus offset adjusting section 270, FIG. 13, converts the tracking error signal S34 into a digital signal. The MAX.MIN calculating section 72 calculates the maximum value (TEmax, FIG. 4) and the minimum value (TEmin, FIG. 4) of the digital tracking signal S71 according to the flowchart shown in FIG. 5. Subsequently, the optimal offset calculating section 273 executes a sequence of steps for setting a focus offset, as will be described hereinafter with reference to FIG. 18.

At the beginning of the procedure shown in FIG. 18, the optimal offset calculating unit 273 sets in the offset setting unit or D/A converter 274 an initial value V$\alpha$ which sets up a substantially zero offset (step 400). The resultant output signal S274 of the offset setting unit 274 is applied to the input resistance Ri2 of the amplifier 33, FIG. 14. As a result, the amplification of the amplifier 33 is changed to set a substantially zero focusing offset in the focusing servosystem. In this condition, the MAX.MIN calculating section 72 calculates the maximum and minimum values, i.e., TEmax and TEmin of the tracking error signal S71 at the offset having been set (step 401). The optimal offset calculating unit 273 sets a difference TEmax−TEmin as a current amplitude Ai-1 and, at the same time, sets Si-1=1 meaning that an offset is effected in the positive (+) direction (step 402). Subsequently, the value V$\alpha$ having been set in the offset setting unit 274 is replaced with V$\alpha$+$\Delta$V$\alpha$, whereby a focusing offset is set (step 403). It is to be noted that the sign "+" in the step 403 may be replaced with "−" as far as the initial value is concerned. The value $\Delta$V$\alpha$ is an extremely small value and is several tens of millivolts in terms of focusing offset.

When the initialization represented by the steps 400 to 403 is completed, the MAX.MIN calculating unit 72 determines the maximum and minimum values TEmax and TEmin of the tracking error signal S71 at the offset V$\alpha$+$\Delta$V$\alpha$ (step 404). Then, the optimal offset calculating unit 273 calculates a new amplitude Ai=TEmax−TEmin (step 405). This is followed by steps 406 to 410-1, 410-2 and 411-1$a$, 411-1$b$, 411-2$a$ and 411-2$b$. Specifically, the old amplitude Ai-1 and the new amplitude Ai are compared (steps 406 and 407). A determination is made as to whether or not the added offset $\Delta V\alpha$ increased the amplitude (steps 408a and 409). If the answer of the step 409 is positive, i.e. Y, meaning that the offset $\Delta V\alpha$ increased the amplitude, the step 409 is followed by a step 410-1; if otherwise, the step 409 is followed by a step 410-2. In these steps 410-1 and 410-2, a determination is made as to whether to add an offset again or to reduce the offset.

For example, when $V\alpha=V\alpha+\Delta V\alpha$ and Si-1=1 are set in a step 411-1b and the resultant difference $\alpha$ between the old and new amplitudes Ai-1 and Ai is positive in sign (step 409), it is determined that the increment $\delta V\alpha$ of offset increased the amplitude. Further, $V\alpha=V\alpha+\Delta V\alpha$ and Si-1=1 are set in the step 211-1b, followed by the step 404 as indicated by a line A. On the other hand, when $V\alpha=V\alpha+\Delta V\alpha$ and Si-1=1 are set in the step 411-b and the resultant difference $\alpha$ is negative, it is determined that the increment $\Delta V\alpha$ of offset reduced the amplitude (step 409). In this case, a step 411-2b is executed to set $V\alpha=V\alpha-2\cdot\Delta V\alpha$ and Si-1=0, and the program returns to the step 404. Here, the decrement "$-2\Delta V\alpha$" is selected since "$-\Delta V\alpha$" is exactly the same as the offset of the previous calculation and would therefore need wasteful operations.

While the above sequence of steps is repeated, the absolute value $|\alpha|$ of the difference $\alpha$ between the old and new amplitudes and Ai in due course becomes smaller than the threshold $\beta$ (step 407). Then, it is determined that the amplitude is coincident with the peak P shown in FIG. 17, i.e., that the focus is not offset. Finally, the tracking servo control is rendered effective in a step 408b.

Assume that the pickup 10 has an aberration in the optics thereof and, therefore, a change in the focus offset deforms the beam spot into, for example, an oval shape. Then, should an offset be so set as to maximize the amplitude of the tracking error signal S71, the amplitude of the sensed data signal S10 and, therefore, the reading accuracy might be reduced. In such a case, it is preferable to set a focusing offset produced by adding a given value to or subtracting it from the offset which maximizes the amplitude of the tracking error S34.

As described above, even when the focus is offset due to aging such as the deflection of the base and the deterioration of various component parts, the focus offset adjusting section 270 changes the focusing offset at the beginning of focus servo which follows the turn-on of the power supply or the replacement of a disk, thereby searching for the peak of the amplitude of the tracking error signal S34. Based on this peak P, the adjusting section 270 corrects the offset of focus automatically.

The present invention is not limited to the illustrative embodiments shown and described and may be modified in various ways. For example, while the focus offset adjusting section 270 shown in FIG. 13 adjusts the focus offset by processing which uses digital signals, it may be implemented with any other suitable circuitry. Specifically, an arrangement may be made such that a time constant circuit made up of a capacitor and a resistor determines the maximum and minimum amplitudes on the basis of the tracking signal S34 which is fed from the amplifier 34, an operational amplifier or similar device determines an offset on the basis of the determined amplitudes, and this offset is fed back to the input of the amplifier 33.

The focus offset adjusting section 270 corrects the focus on the basis of the amplitude of the tracking error signal S34. If desired, the tracking error signal S34 may be replaced with a track-cross signal which is the sum output of the two-part type photodetector 20 adapted to detect a tracking error, or the sensed signal S10 which appears after the effect of tracking servo, as shown in FIG. 15.

Even the optical pickup 10 shown in FIG. 1 and/or the servo error signal generating section 30 shown in FIG. 13 may be modified, as desired.

While the foregoing description has concentrated on a photomagnetic disk, the present invention is practicable even with other various kinds of optical disk apparatuses such as an addition type apparatus and a player type apparatus.

In summary, the illustrative embodiment with the focus offset adjusting section 270 is capable of automatically adjusting the focus offset and thereby eliminates the offset of focus with accuracy. To achieve this advantage, the adjusting section detects, at the beginning of focusing servo which follows the turn-on of the power source of the loading of a disk, the amplitudes of a detected signal joining in either one of focusing servo control and tracking servo control or the amplitudes of a sensed data signal appearing after the start of tracking servo and adjusts the focus offset in such a manner to maximize the amplitude of interest. This is successful in correcting the offset of focus due to aging such as the deflection of the base or the deterioration of various component parts and, therefore, in insuring accurate recording and playback over a long period of time.

While the present invention has been described with reference to particular illustrative embodiment, it is not to be restricted by those embodiments but only by the appended claims. It is to be appreciated that those skilled in the art can change or modify the embodiments without departing from the scope and spirit of the present invention.

What is claimed is:

1. A focus offset adjusting device comprising:

an optical pickup means for emitting a light beam onto a recording medium and for outputting, in response to a reflection from said recording medium, a first and a second signal joining in focusing servo control and tracking servo control, respectively, and a third signal representative of data recorded in said medium;

a signal generating means for outputting, in response to said first signal and said second signal, a focusing servo error signal assigned to focusing servo control and a tracking servo error signal assigned to tracking servo control;

a drive means for outputting, in response to said focusing and tracking servo error signals, a first drive current and a second drive current assigned to focusing and tracking, respectively;

an actuator means for moving said optical pickup means in a focusing direction and a tracking direction in response to said first drive current and said second drive current, respectively; and an adjusting means operative in response to either one of said second signal which appears immediately after the focus servo control is started and said third signal which appears while the tracking servo is effected for providing said drive means with a focus offset signal representative of a value of a focus offset, and for determining when a difference between a maximum and a minimum of the one signal is approximately at its maximum;

said drive means being further operative in response to the focus offset signal thus provided to correct the first and second drive currents;

said adjusting means maintaining, after having determined when the difference is approximately at its maximum, the focus offset signal representative of the value of the focus offset produced when the difference is approximately at its maximum, to thereby minimize the focus offset.

2. A device in accordance with claim 1, wherein said signal generating means comprises an amplifier means for amplifying said focusing servo error signal for said focusing servo and for receiving a fourth signal;

said adjusting means comprising:
a first calculating means for producing a first value which represents the maximum of said tracking servo error signal and for producing a second value which represents the minimum of said tracking servo error signal;
a second calculating means for producing a focus offset at which a difference between said first and second values is approximately at its maximum; and
an offset setting means responsive to said second calculating means for feeding said fourth signal to said amplifier means.

3. A device in accordance with claim 2, wherein said adjusting means comprises an inputting means for feeding said tracking error signal to said first calculating means.

4. A device in accordance with claim 3, wherein said inputting means comprises a signal converting means for converting said tracking servo error signal into a corresponding digital signal before said tracking servo error signal is fed to said first calculating means;
and wherein said first and second calculating means comprises a processing system using a stored program control.

5. A focus offset adjusting device comprising:
an optical pickup means for emitting a light beam onto a recording medium and for outputting, in response to a reflection from said recording medium, a first and a second signal joining in focusing servo control and tracking servo control, respectively, and a third signal representative of data recorded in said medium;
a signal generating means for outputting, in response to said first signal and said second signal, a focusing servo error signal assigned to focusing servo control and a tracking servo error signal assigned to tracking servo control;
a drive means for outputting, in response to said focusing and tracking servo error signals, a first drive current and a second drive current assigned to focusing and tracking, respectively;
an actuator means for moving said optical pickup means in a focusing direction and a tracking direction in response to said first drive current and said second drive current, respectively; and
an adjusting means operative in response to said second signal which appears immediately after the focus servo control is stated for providing said drive means with a focus offset signal representative of a value of a focus offset, and for determining when a difference between a maximum and minimum of the second signal is approximately at its maximum;

said drive means being further operative in response to the focus offset signal thus provided to correct the first and second drive currents;

said adjusting means maintaining, after having determined when the difference is approximately at its maximum, the focus offset signal representative of the value of the focus offset produced when the difference is approximately at its maximum, to thereby minimize the focus offset.

6. A focus offset adjusting device comprising:
an optical pickup means for emitting a light beam onto a recording medium and for outputting, in response to a reflection from said recording medium, at first and a second signal joining in focusing servo control and tracking servo control, respectively, and a third signal representative of data recorded in said medium;
a signal generating means for outputting, in response to said first signal and said second signal, a focusing servo error signal assigned to focusing servo control and a tracking servo error signal assigned to tracking servo control;
a drive means for outputting, in response to said focusing and tracking servo error signals, a first drive current and a second drive current assigned to focusing and tracking, respectively;
an actuator means for moving said optical pickup means in a focusing direction and a tracking direction in response to said first drive current and said second drive current, respectively; and
an adjusting means operative in response to said third signal which appears while the tracking servo is effected for providing said drive means with a focus offset signal representative of a value of a focus offset, and for determining when a difference between a maximum and a minimum of the third signal is approximately at its maximum;

said drive means being further operative in response to the focus offset signal thus provided to correct the first and second drive currents;

said adjusting means maintaining, after having determined when the difference is approximately at its maximum, the focus offset signal representative to the value of the focus offset produced when the difference is approximately at its maximum, to thereby minimize the focus offset.

7. A focus offset adjusting device comprising:
an optical pickup device for emitting a light beam onto a recording medium and for outputting, in response to a reflection from said recording medium, a first and a second signal joining in focusing servo control and tracking servo control, respectively, and a third signal representative of data recorded in said medium;
a signal generator circuit for outputting, in response to said first signal and said second signal, a focusing servo error signal assigned to focusing servo control and a tracking servo error signal assigned to tracking servo control;
a drive circuit for outputting, in response to said focusing and tracking servo error signals, a first drive current and a second drive current assigned to focusing and tracking, respectively;
an actuator for moving said optical pickup device in a focusing direction and a tracking direction in response to said first drive current and said second drive current, respectively; and an adjusting circuit operative in response to either one of said second signal which appears immediately after the focus servo control is started and said third signal which appears while the tracking servo is effected for providing said drive circuit with a focus offset signal representative of a value of a focus offset, and for determining when a difference between a maximum and a minimum of the one signal is approximately at its maximum;

said drive circuit being further operative in response to the focus offset signal thus provided to correct the first and second drive currents;

said adjusting circuit maintaining, after having determined when the difference is approximately at its maximum, the focus offset signal representative of the value of the focus offset produced when the difference is approximately at its maximum, to thereby minimize the focus offset.

8. A method for adjusting a focus offset of an optical pickup means for emitting a light beam onto a recording medium and sensing a reflection from said recording medium, comprising the steps of:

producing, in response to a reflection from said recording medium, a first and a second signal joining in focusing servo control and tracking servo control respectively, and a third signal representative of data recorded in said medium;

generating, in response to said first signal and said second signal, a focusing servo error signal assigned to focusing servo control and a tracking servo error signal assigned to tracking servo control;

outputting, in response to said focusing and tracking servo error signals, a first drive current and a second drive current assigned to focusing and tracking, respectively;

moving said optical pickup means in a focusing direction and a tracking direction in response to said first drive current and said second drive current, respectively;

generating, in response to either one of said second signal which appears immediately after the focus servo control is started and said third signal which appears while the tracking servo is effected, a focus offset signal representative of a value of a focus offset;

determining when a difference between a maximum and a minimum of the one signal is approximately at its maximum;

correcting, in response to the focus offset signal, the first and second drive currents; and maintaining, after having determined when the difference is approximately at its maximum, to hereby minimize the focus offset.

* * * * *